United States Patent
Park et al.

(10) Patent No.: US 10,083,349 B2
(45) Date of Patent: Sep. 25, 2018

(54) EVENT SIGNAL PROCESSING METHOD AND APPARATUS

(71) Applicant: SAMSUNG ELECTRONICS CO., LTD., Suwon-si (KR)

(72) Inventors: Keun Joo Park, Seoul (KR); Jin-Man Park, Yongin-si (KR); Baek Hwan Cho, Seoul (KR); Eric Hyunsurk Ryu, Hwaseong-si (KR); Young Wan Seo, Seoul (KR); Jaehoon Cho, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 78 days.

(21) Appl. No.: 15/167,430

(22) Filed: May 27, 2016

(65) Prior Publication Data
US 2017/0213077 A1   Jul. 27, 2017

(30) Foreign Application Priority Data

Jan. 22, 2016   (KR) .................. 10-2016-0007927

(51) Int. Cl.
*G06K 9/00* (2006.01)
*G06F 3/01* (2006.01)
(Continued)

(52) U.S. Cl.
CPC ......... *G06K 9/00335* (2013.01); *G06F 3/017* (2013.01); *G06K 9/209* (2013.01); *H04N 5/23235* (2013.01); *H04N 5/335* (2013.01)

(58) Field of Classification Search
CPC ........... G06K 9/00221; G06K 9/00234; G06K 9/00268; G06K 9/00281; G06K 9/00288; G06K 9/00302; G06K 9/00335; G06K 9/00362; G06K 9/00369; G06K 9/00597; G06K 9/00624; G06K 9/0063; G06K 9/00664; G06K 9/00711; G06K 9/00771; G06K 9/00778; G06K 9/00785; G06K 9/00791; G06K 9/00798; G06K 9/209; G06K 9/3241; G06K 9/62; G06K 9/6217; G06K 9/6227; G06K 9/6293;
(Continued)

(56) References Cited

U.S. PATENT DOCUMENTS

| 5,875,268 A | 2/1999 | Miyake |
| 6,213,653 B1 | 4/2001 | Borg et al. |

(Continued)

FOREIGN PATENT DOCUMENTS

| KR | 10-2010-0078623 A | 7/2010 |
| KR | 10-2015-0120124 A | 10/2015 |

OTHER PUBLICATIONS

Communication dated Jun. 14, 2017 issued by the European Patent Office in counterpart European Patent Application No. 16180283.0.

*Primary Examiner* — Jose Couso
(74) *Attorney, Agent, or Firm* — Sughrue Mion, PLLC

(57) ABSTRACT

An event signal processing method and apparatus are provided. The event signal processing method includes receiving, from an event-based sensor, event signals including timestamps, generating a first timestamp map based on the timestamps, and interpolating a new timestamp into the first timestamp map based on at least two timestamps of the first timestamp map, to generate a second timestamp map.

22 Claims, 12 Drawing Sheets

(51) Int. Cl.
*G06K 9/20* (2006.01)
*H04N 5/232* (2006.01)
*H04N 5/335* (2011.01)

(58) Field of Classification Search
CPC . G06K 2009/00583; G06K 2209/05–2209/27; G06K 2009/00328; H04N 5/23235; H04N 5/335; H04N 5/3655; H04N 9/735; H04N 19/46; H04N 21/2353; H04N 21/44008; H04N 21/44218; H04N 21/4344; H04N 21/23608; H04N 21/8547; H04N 13/0062; H04N 13/0066; H04N 2201/3205; H04N 2201/3226; H04N 2201/3228; H04N 2201/3229; H04N 2201/3256; H04N 1/6083; G06F 11/3065; G06F 11/3086; G06F 17/301; G06F 17/30525; G06F 17/30353; G06F 17/30359; G06F 17/30722; G06F 17/30997; G06F 2211/004; G06F 2211/104; G06F 2212/466; G06F 2212/7207; G06F 2201/835; G06F 2212/7209; G06F 2221/2151; G06F 3/017; G06T 2207/10004; G06T 7/246; G06T 7/55; A61B 6/583; A61N 5/1048; A61N 2005/1054

See application file for complete search history.

(56) References Cited

U.S. PATENT DOCUMENTS

| | | | |
|---|---|---|---|
| 8,340,460 | B2 | 12/2012 | Deutschmann |
| 8,571,106 | B2 | 10/2013 | Crinon et al. |
| 8,582,006 | B2 | 11/2013 | Smith |
| 8,659,675 | B2 | 2/2014 | Takahashi et al. |
| 8,786,625 | B2 | 7/2014 | Cote et al. |
| 9,002,854 | B2 * | 4/2015 | Baum ............... G06F 17/30551 707/746 |
| 9,071,765 | B2 | 6/2015 | Motta |
| 9,462,164 | B2 * | 10/2016 | Venkataraman ....... H04N 5/225 |
| 9,696,440 | B2 * | 7/2017 | Shahar .................... G01T 7/005 |
| 9,927,539 | B2 * | 3/2018 | Shahar .................... G01T 7/005 |
| 2006/0197664 | A1 * | 9/2006 | Zhang .................... G06T 7/246 340/555 |
| 2014/0056513 | A1 | 2/2014 | Grossmann et al. |
| 2014/0368712 | A1 | 12/2014 | Park et al. |
| 2015/0009286 | A1 | 1/2015 | Omori et al. |
| 2015/0030204 | A1 | 1/2015 | Lee et al. |
| 2015/0042775 | A1 | 2/2015 | Zhao |
| 2015/0055861 | A1 | 2/2015 | Wang et al. |
| 2015/0163465 | A1 | 6/2015 | Li |
| 2015/0193910 | A1 | 7/2015 | Tuzel et al. |
| 2015/0215590 | A1 | 7/2015 | Nowozin et al. |
| 2016/0080670 | A1 * | 3/2016 | Rangan ............. G06K 9/00771 348/302 |
| 2017/0085819 | A1 * | 3/2017 | Lee .................... H04N 5/37455 |
| 2017/0289646 | A1 * | 10/2017 | Kanthapanit ...... H04N 21/8547 |

* cited by examiner

| 4 | 2 | 1 |
|---|---|---|
| null | 4 3.5 3.5 2.5<br>3 4 3.5 3.5<br>3 3 4 3.5<br>1 3 3 4 | 2 |
| null | null | 4 |

EVENT SIGNAL PROCESSING METHOD AND APPARATUS

CROSS-REFERENCE TO RELATED APPLICATION

This application claims priority from Korean Patent Application No. 10-2016-0007927, filed on Jan. 22, 2016, in the Korean Intellectual Property Office, the disclosure of which is incorporated herein by reference in its entirety.

BACKGROUND

1. Field

Methods and apparatuses consistent with exemplary embodiments relate to processing an event signal.

2. Description of the Related Art

Technologies of identifying or recognizing objects or gestures are being utilized in various fields. An event-based sensor is used to identify or recognize an object, for example, for gesture recognition, face recognition or people recognition. To increase an accuracy of identification or recognition, research on a technology of processing a signal output from an event-based sensor is being conducted.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an event signal processing method including receiving, from an event-based sensor, event signals including timestamps, generating a first timestamp map based on the timestamps, and interpolating a new timestamp into the first timestamp map based on at least two timestamps of the first timestamp map, to generate a second timestamp map.

The generating the first timestamp map may include setting a value of a pixel of the first timestamp map to a timestamp included in an event signal corresponding to the pixel, among the event signals.

The interpolating may include interpolating the new timestamp into the first timestamp map based on a timestamp of a pixel adjacent to a pixel having the new timestamp, among pixels of the first timestamp map.

The interpolating may include interpolating the new timestamp into the first timestamp map based on an average of the at least two timestamps.

The interpolating may include dividing a pixel among pixels of the first timestamp map into new pixels, and interpolating new timestamps into the new pixels based on the at least two timestamps.

The interpolating the new timestamps may include setting each of the new timestamps to a timestamp of the divided pixel.

The interpolating the new timestamps may include selecting a highest timestamp from at least one timestamp of at least one pixel adjacent to a new pixel among the new pixels, and setting a new timestamp of the new pixel to an average of the selected highest timestamp and a timestamp of the divided pixel.

The interpolating may include generating a vector based on the at least two timestamps, the vector representing a flow of events corresponding to the event signals, and interpolating the new timestamp into the first timestamp map based on the vector.

A resolution of the second timestamp map may be higher than a resolution of the first timestamp map.

Each of sensing elements of the event-based sensor may sense an event and output an activation signal.

An event signal may include identification information identifying a sensing element sensing an event among sensing elements of the event-based sensor, and a timestamp indicating a time at which the event is sensed.

The event signal processing method may further include recognizing a user input corresponding to the event signals based on the second timestamp map.

The event signal processing method may further include enlarging the second timestamp map, and recognizing a user input corresponding to the event signals based on the first timestamp map and the enlarged second timestamp map.

The event signal processing method may further include generating a first recognition result corresponding to the event signals based on the first timestamp map, generating a second recognition result corresponding to the event signals based on the second timestamp map, and recognizing a user input corresponding to the event signals based on the first recognition result and the second recognition result.

A non-transitory computer-readable storage medium may store a program including instructions to control a processor to perform the method.

According to an aspect of another exemplary embodiment, there is provided a pixel augmentation method based on an event-based vision sensor, the pixel augmentation method including receiving time information of times at which events are sensed by sensing elements of the event-based vision sensor, generating timestamps of pixels corresponding to the sensing elements, based on the time information, dividing a target pixel among the pixels into sub-pixels, and generating timestamps of the sub-pixels based on the timestamps of the pixels.

The generating the timestamps of the sub-pixels may include setting a timestamp of a sub-pixel among the sub-pixels to a timestamp of the target pixel.

The generating the timestamps of the sub-pixels may include interpolating a timestamp into a sub-pixel among the sub-pixels based on a timestamp of the target pixel and at least one timestamp of at least one pixel adjacent to the sub-pixel, among the pixels.

The interpolating may include determining an average of the timestamp of the target pixel and a highest timestamp among the at least one timestamp of the at least one pixel adjacent to the sub-pixel, and setting the timestamp of the sub-pixel to be the average.

The generating the timestamps of the sub-pixels may include generating a vector based on the timestamps of the pixels, the vector representing a flow of the events, and setting the timestamps of the sub-pixels based on a direction of the vector.

The setting the timestamps of the sub-pixels may include selecting, from the sub-pixels, a sub-pixel arranged in a direction perpendicular to the direction of the vector, and setting a timestamp of the selected sub-pixel to a timestamp of the target pixel.

The setting the timestamps of the sub-pixels may include selecting, from the sub-pixels, a sub-pixel arranged in a direction parallel to the direction of the vector, and interpolating a timestamp into the selected sub-pixel based on a timestamp of a pixel adjacent to the selected sub-pixel, among the pixels.

The generating the timestamps of the sub-pixels may include estimating, based on the timestamps of the pixels, a timestamp of a pixel corresponding to a sensing element that does not sense the events among the sensing elements, interpolating the timestamps into the sub-pixels based on the estimated timestamp and the timestamps of the pixels, and restoring the timestamp of the pixel corresponding to the sensing element to an original timestamp.

According to an aspect of another exemplary embodiment, there is provided an event signal processing apparatus including a processor configured to receive, from an event-based sensor, event signals including timestamps, generate a first timestamp map based on the timestamps, and interpolate a new timestamp into the first timestamp map based on at least two timestamps of the first timestamp map, to generate a second timestamp map.

The processor may be further configured to generate a vector based on the at least two timestamps, the vector representing a flow of events corresponding to the event signals, determine a pixel of the first timestamp map to be outside a boundary of the first timestamp map in a direction of the vector, the pixel having the new timestamp, and set the new timestamp to a null timestamp.

According to an aspect of another exemplary embodiment, there is provided a pixel augmentation apparatus based on an event-based vision sensor, the pixel augmentation apparatus including a processor configured to receive time information of times at which events are sensed by sensing elements of the event-based vision sensor, generate timestamps of pixels corresponding to the sensing elements, based on the time information, divide a target pixel among the pixels into sub-pixels, and generate timestamps of the sub-pixels based on the timestamps of the pixels.

The processor may be further configured to divide a sub-pixel among the sub-pixels into additional sub-pixels, and generate timestamps of the additional sub-pixels based on the timestamps of the pixels and the timestamps of the sub-pixels.

BRIEF DESCRIPTION OF THE DRAWINGS

The above and other aspects will become apparent and more readily appreciated from the following detailed description of certain exemplary embodiments, taken in conjunction with the accompanying drawings of which:

FIGS. 3A and 3B are diagrams illustrating an operation of interpolating a timestamp, according to an exemplary embodiment;

DETAILED DESCRIPTION

Figure 1:
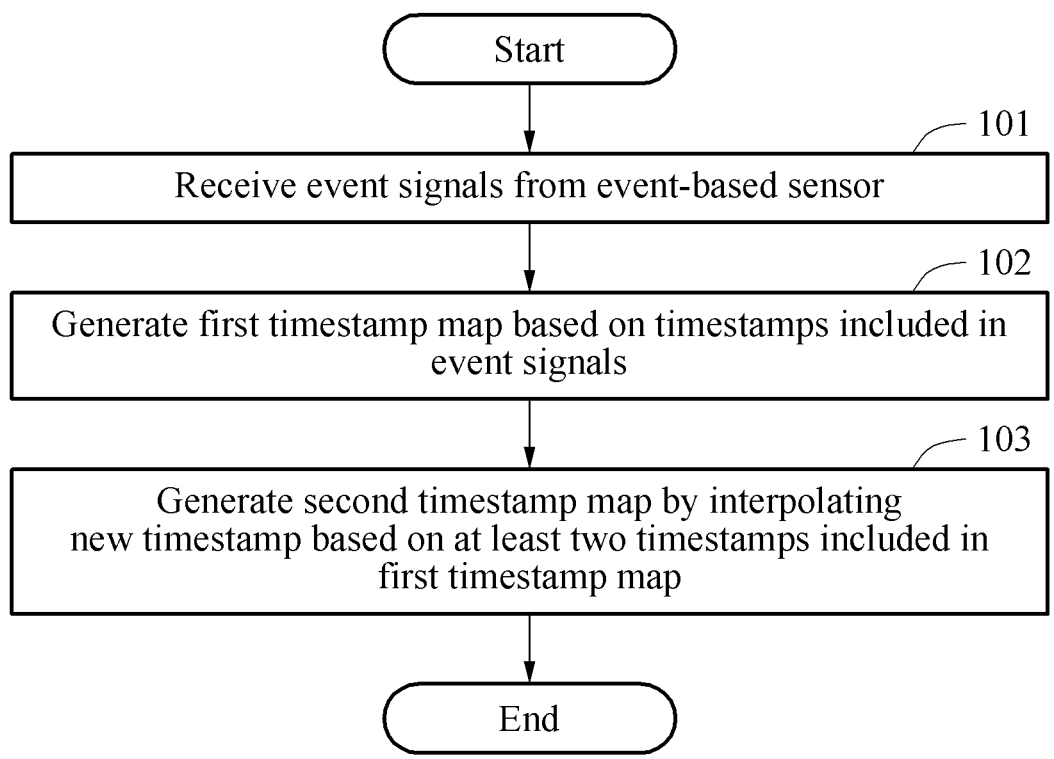
FIG. 1 is a flowchart illustrating an event signal processing method according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

Although terms of "first" or "second" are used to explain various components, the components are not limited to the terms. These terms should be used only to distinguish one component from another component. For example, a "first" component may be referred to as a "second" component, or similarly, the "second" component may be referred to as the "first" component within the scope of the right according to the concept of the present disclosure.

It should be understood that when a component is referred to as being "connected" or "coupled" to another component, it can be directly connected or coupled to the other component or intervening components may be present.

As used herein, the singular forms are intended to include the plural forms as well, unless the context clearly indicates otherwise.

Exemplary embodiments may be implemented as various products, for example, personal computers (PC), laptop computers, tablet computers, smartphones, televisions (TVs), smart home appliances, intelligent vehicles, kiosks, or wearable devices. For example, exemplary embodiments may be employed to recognize a user in a smartphone, a mobile device, or a smart home system. Exemplary embodiments may be applied to a payment service through recognition of a user. Also, exemplary embodiments may be applied to an intelligent vehicle system to recognize a user and to automatically start.

FIG. 1 is a flowchart illustrating an event signal processing method according to an exemplary embodiment.

Referring to FIG. 1, in operation 101, an event signal processing apparatus receives event signals from an event-based sensor. The event signal processing apparatus may be an apparatus for processing an event signal, and may be implemented by, for example, software, hardware (processor(s), integrated circuit(s), etc.) or various combinations thereof.

The event-based sensor may sense an event using a plurality of sensing elements, and may output an event signal based on an output signal of a sensing element that senses an event. A sensing element that senses an event among the plurality of sensing elements may also be referred to as a "target element." The target element may be activated in response to a predetermined event being sensed, and the activated target element may output an activation signal. The event-based sensor may generate an event signal based on the activation signal output from the target element among the plurality of sensing elements, and may output the generated event signal.

An event may be a phenomenon sensed by sensing elements, and each of the plurality of sensing elements may sense a predetermined event and may output an activation signal. An event sensed by a sensing element may be variously defined based on a type of event-based sensors. For example, an event-based vision sensor may sense an event in which an intensity of light incident on the plurality of sensing elements changes. Also, an event may be defined as a change in a frequency, a strength of a wave or a magnitude of a force, and may be applied to an event-based sensor, and a quantitative relationship to define an event may be variously applied or modified.

The sensing elements of the event-based sensor may sense an event satisfying a predetermined condition. For example, sensing elements of an event-based vision sensor may sense an event in which a change in an intensity of incident light is greater than or equal to a preset threshold, and may output an activation signal.

The event-based sensor may output an event signal based on an activation signal output from a sensing element. The event signal may include identification information used to identify a target element that outputs an activation signal, and time information (for example, a timestamp) about a time at which an event is sensed by the target element. The identification information may include, for example, an address or an index of a sensing element. The event signal may further include a type of events, for example, polarity information.

In operation 102, the event signal processing apparatus generates a first timestamp map based on timestamps included in the event signals. A timestamp map may be a map displaying timestamps in a predetermined position to represent an event occurring during a period from a predetermined point in time to a current point in time. For example, the timestamp map may include a plurality of pixels that store timestamps. The event signal processing apparatus may generate a timestamp map by adjusting a timestamp corresponding to each of the pixels.

The event-based sensor may output event signals using a serial communication. Each of the event signals may include identification information of a target element sensing an event, as described above, and accordingly the event signal processing apparatus may identify a target element corresponding to an event signal. The event signal processing apparatus may set a value of a pixel corresponding to a target element in a timestamp map as a timestamp included in an event signal. The event signal processing apparatus may generate a first timestamp map by setting values of pixels in the first timestamp map as timestamps included in event signals.

Each of pixels of a timestamp map may store a latest timestamp. For example, when a new event signal is received, the event signal processing apparatus may overwrite a new timestamp included in the new event signal on a timestamp stored in advance in a timestamp map.

In operation 103, the event signal processing apparatus generates a second timestamp map by interpolating a new timestamp based on at least two timestamps included in the first timestamp map. The new timestamp may be interpolated based on timestamps of the first timestamp map, and may be, for example, a timestamp estimated by the event signal processing apparatus based on the timestamps of the first timestamp map.

The second timestamp map may include the new timestamp interpolated by the event signal processing apparatus. Due to the interpolated new timestamp, a resolution of the second timestamp map may be higher than a resolution of the first timestamp map. For example, the event signal processing apparatus may demosaic the first timestamp map to generate a second timestamp map having a relatively high resolution.

The event signal processing apparatus may interpolate the new timestamp based on a position relationship between pixels, a vector estimated from the timestamps of the first timestamp map, calculation of the timestamps of the first timestamp map, or various combinations thereof. Examples of interpolating a new timestamp to generate a second timestamp map will be described with reference to FIGS. 2, 3A, 3B, 4A, 4B, 4C, 4D and 4E. However, a scheme of interpolating a timestamp during processing of an event signal in an event-based sensor is not limited to the examples.

Figure 2:
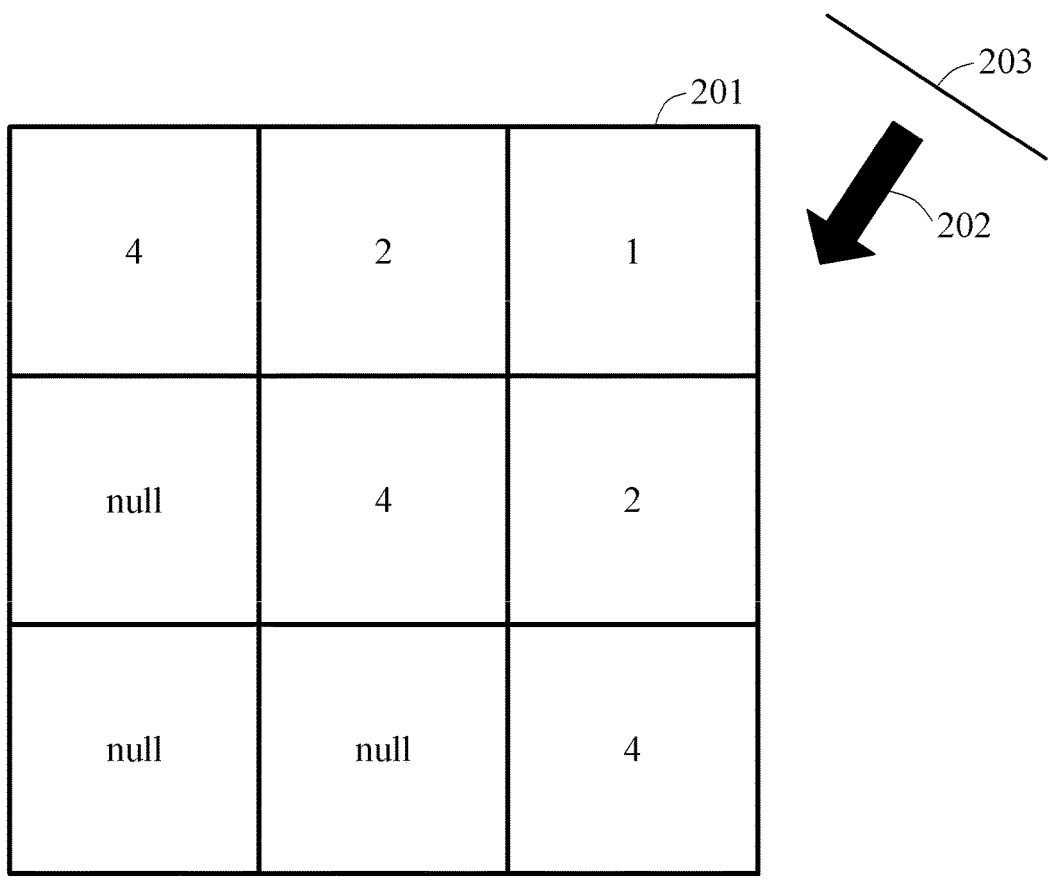
FIG. 2 is a diagram illustrating a timestamp map according to an exemplary embodiment.

FIG. 2 is a diagram illustrating a timestamp map 201 according to an exemplary embodiment.

Referring to FIG. 2, the timestamp map 201 includes a plurality of pixels. The plurality of pixels corresponds to a plurality of sensing elements of an event-based sensor. Each of the plurality of pixels may store a timestamp. Each of timestamps shown in the timestamp map 201 indicates a time at which a target element of the event-based sensor senses an event. In other words, the timestamp map 201 may indicate that events are sensed sequentially in a direction from an upper right side to a lower left side.

Events sensed by the event-based sensor may occur by various scenarios. For example, when an object moves within a sensing range of an event-based vision sensor, when the event-based vision sensor moves, when light projected onto an object located within the sensing range of the event-based vision sensor changes, or when light emitted from a luminous object located within the sensing range of the event-based vision sensor changes, sensing elements of the event-based vision sensor may sense events.

An event signal processing apparatus may generate the timestamp map 201 based on event signals output from the event-based sensor. The event signals may be sequentially or simultaneously output. In an example, in response to an event signal being received, the event signal processing apparatus may update a value of a pixel corresponding to the event signal in the timestamp map 201. In another example, the event signal processing apparatus may accumulate event signals received during a predetermined period of time, for example, 20 milliseconds (ms), in a temporary storage space, and may generate a timestamp map corresponding to the event signals based on timestamps and identification information of a target element for each of the event signals.

The event signal processing apparatus may generate a vector 202 based on the timestamps of the timestamp map 201. The vector 202 may represent a flow of events corresponding to the event signals received from the event-based sensor. The vector 202 may represent a direction in which a plurality of events sensed by target elements of the event-based sensor occurs in a time series during a predetermined period of time. For example, when events (for example, a change in light) are sensed by an event-based vision sensor, an optical flow may be used as the vector 202.

Referring to FIG. 2, the event signal processing apparatus may calculate the timestamps of the timestamp map 201, and may generate the vector 202. For example, a vector representing a direction in which timestamps increase may be generated. The event signal processing apparatus may interpolate a new timestamp based on a direction 203 perpendicular to the vector 202, which will be described with reference to FIGS. 3A through 4E. In FIGS. 3A through 4E, the timestamp map 201 is assumed as a first timestamp map in which a new timestamp is not interpolated.

Figure 3A:
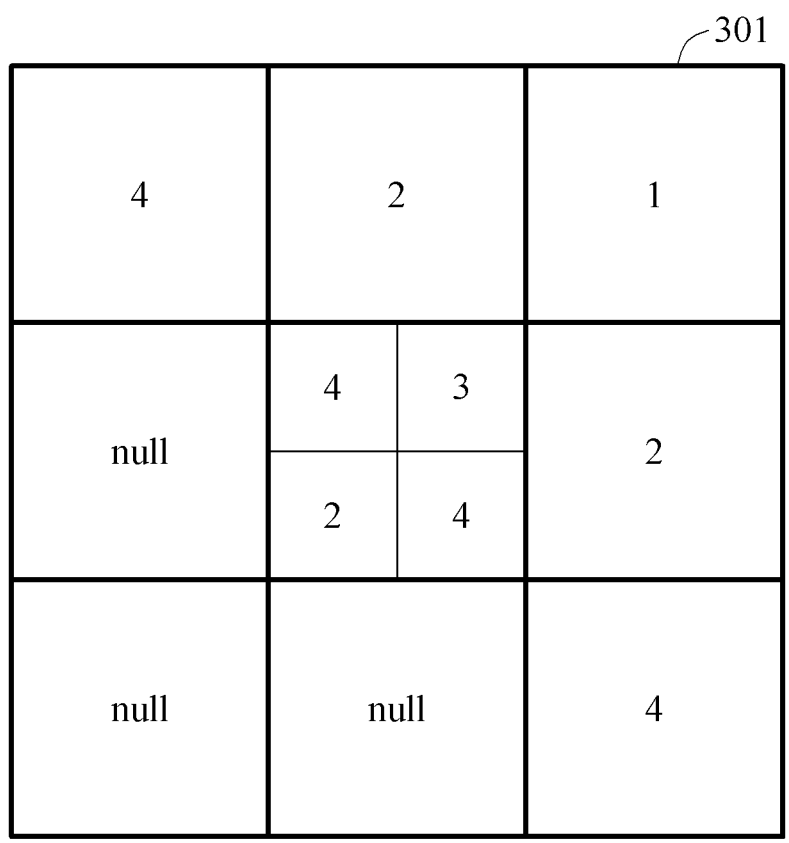

FIGS. 3A and 3B are diagrams illustrating an operation of interpolating a timestamp, according to an exemplary embodiment.

An event signal processing apparatus may interpolate a new timestamp based on a timestamp of at least one pixel adjacent to a pixel corresponding to the new timestamp. A scheme of interpolating a new timestamp based on timestamps of neighboring pixels may be variously applied based on predefined setting information, and may be changed depending on exemplary embodiments.

Referring to FIG. 3A, the event signal processing apparatus may generate four new pixels by dividing a pixel located at (2, 2) in the first timestamp map 201 including timestamps corresponding to 3×3 pixels. In the following description, a pixel to be divided among pixels of the first timestamp map 201 may be referred to as a "target pixel," and pixels generated by dividing a target pixel may be referred to as "sub-pixels." A number of sub-pixels may be defined in advance. The event signal processing apparatus may interpolate new timestamps of four sub-pixels based on timestamps of the first timestamp map 201, and may generate a second timestamp map 301 including the interpolated timestamps.

In an example, the event signal processing apparatus may interpolate a new timestamp of a sub-pixel based on a timestamp of a target pixel of the first timestamp map 201 and timestamps of pixels adjacent to the sub-pixel in the first timestamp map 201. For example, to set a new timestamp "3" of a sub-pixel (hereinafter, referred to as a "first sub-pixel") located in a first quadrant among the four sub-pixels of FIG. 3A, the event signal processing apparatus may select a highest timestamp, that is, a timestamp "2" among timestamps "2," "2" and "1" of pixels adjacent to the first sub-pixel, and may interpolate the new timestamp "3" based on an average of the selected timestamp "2" and a timestamp "4" of the target pixel. Similarly, the event signal processing apparatus may select a highest timestamp, that is, a timestamp "4" among timestamps "4," "2" and "null" of pixels adjacent to each of a sub-pixel located in a second quadrant and a sub-pixel located in a fourth quadrant, and may interpolate a new timestamp "4" based on an average of the selected timestamp "4" and the timestamp "4" of the target pixel. Also, all timestamps of pixels adjacent to a sub-pixel located in a third quadrant are "null." When the timestamp "null" is represented as "0," the event signal processing apparatus may interpolate a new timestamp "2" based on an average of a selected timestamp "0" and the timestamp "4" of the target pixel.

In another example, the event signal processing apparatus may interpolate new timestamps of the sub-pixels based on an average of at least a portion of the timestamps of the first timestamp map 201. In still another example, the event signal processing apparatus may set a new timestamp of at least one among the sub-pixels to be the same as a timestamp of the target pixel.

FIG. 3B illustrates a third timestamp map 302 generated based on timestamps that are interpolated based on timestamps of the second timestamp map 301 of FIG. 3A. Referring to FIG. 3B, the event signal processing apparatus may divide each of the sub-pixels of the second timestamp map 301 into four pixels, and may interpolate, based on the timestamps of the second timestamp map 301, timestamps of the four pixels into which each of the sub-pixels is divided. The above description of FIG. 3A is also applicable to the interpolating. For example, in FIG. 3B, a timestamp "2.5" may be interpolated based on an average of the timestamp "3" of the second timestamp map 301 and a highest timestamp "2" among timestamps "2," "2" and "1" of pixels adjacent to a sub-pixel corresponding to the timestamp "2.5." An interpolation order that timestamps of the four pixels generated by each of the sub-pixels are interpolated may be set based on predefined setting information. For example, the interpolation order may be determined by a vector generated based on timestamps of a timestamp map in which interpolation is not performed. A new timestamp map having a relatively high resolution may be generated regardless of the interpolation order.

FIGS. 4A, 4B, 4C, 4D, and 4E are diagrams illustrating operations of interpolating a timestamp, according to an exemplary embodiment.

Figure 4A:
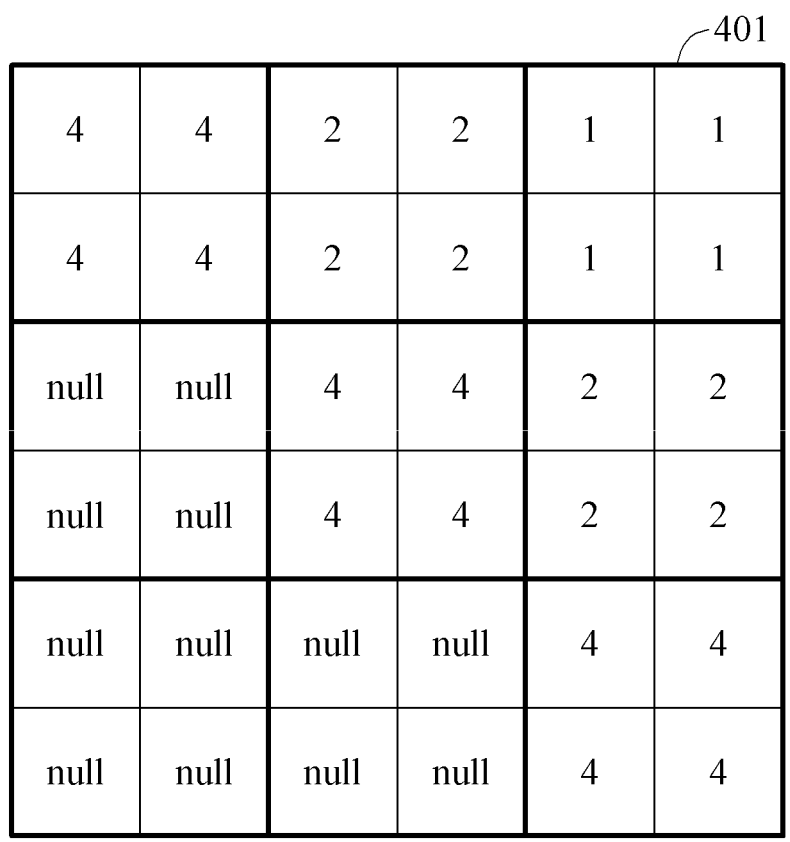
FIGS. 4A, 4B, 4C, 4D and 4E are diagrams illustrating operations of interpolating a timestamp, according to an exemplary embodiment.

Referring to FIG. 4A, an event signal processing apparatus may divide a target pixel of the timestamp map 201 of FIG. 2 into sub-pixels, and may set each of timestamps of the sub-pixels to be the same as a timestamp of the target pixel. A number of the sub-pixels may be defined in advance, and for example, 4×4 sub-pixels may be generated. The event signal processing apparatus may generate a new timestamp map 401 based on timestamps of sub-pixels set to be the same as a timestamp of a target pixel. For example, the event signal processing apparatus may interpolate new timestamps based on a timestamp map, for example, the timestamp map 201, having a resolution of "3×3," and may generate a new timestamp map, for example, the timestamp map 401, having a resolution of "6×6" as a result of the interpolating.

Figure 4B:

Referring to FIG. 4B, the event signal processing apparatus may generate a new timestamp map 402 by interpolating timestamps of sub-pixels based on the timestamps of the timestamp map 201. For example, the event signal processing apparatus may interpolate new timestamps of sub-pixels based on neighboring timestamps in a direction from a center of a target pixel to the sub-pixels. The event signal processing apparatus may interpolate a timestamp "2.5" of a first sub-pixel obtained by dividing a target pixel located at (2, 2) based on an average of a neighboring timestamp "1" in an upper left direction and a timestamp "4" of the target pixel.

Figure 4C:
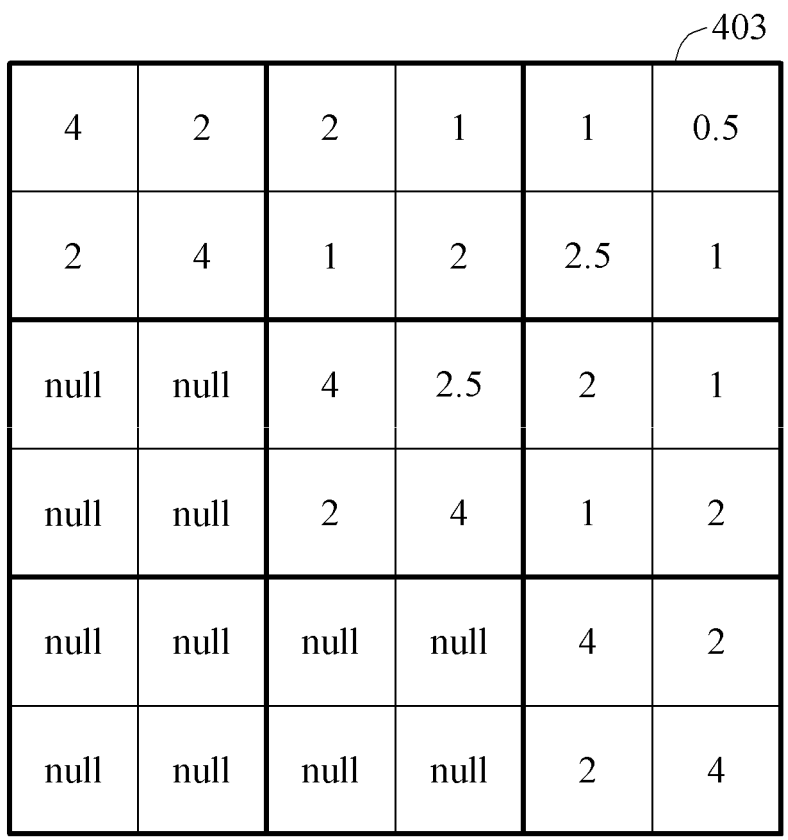

Referring to FIG. 4C, the event signal processing apparatus may generate a timestamp map 403 by adjusting a portion of timestamps of the generated timestamp map 402. The event signal processing apparatus may generate the timestamp map 403 based on a vector representing a flow of events. For example, the event signal processing apparatus may generate the vector 202 based on the timestamps of the original timestamp map 201. As described above, the vector 202 may represent a flow of events corresponding to event signals output from the event-based sensor. The event signal processing apparatus may set timestamps of sub-pixels arranged in the direction 203 perpendicular to the vector 202 among the sub-pixels of the generated timestamp map 402 to be the same as a timestamp of the target pixel. For example, the event signal processing apparatus may select sub-pixels arranged in the direction 203 perpendicular to the vector 202 from sub-pixels of the timestamp map 403, and may set timestamps of the selected sub-pixels to "4" in response to a timestamp of a target pixel including the selected sub-pixels being "4."

Figure 4D:
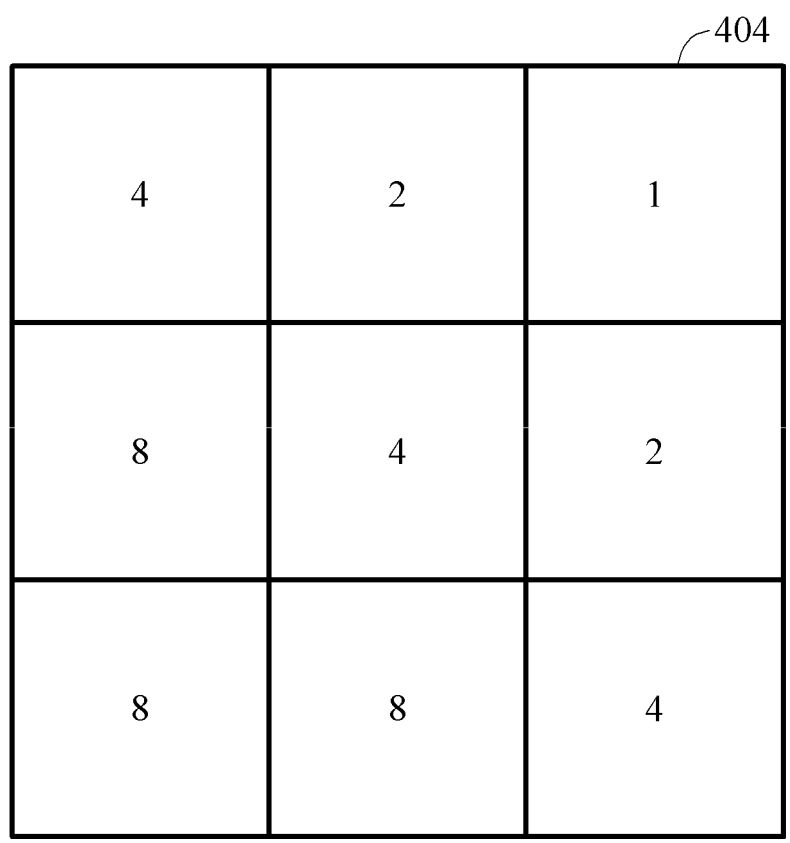

Referring to FIG. 4D, the event signal processing apparatus may estimate a timestamp "null" of the timestamp map 201 as a new timestamp, to prevent an error from occurring during interpolating of a new timestamp in the timestamp map 201. A timestamp "null" among the timestamps of the timestamp map 201 may be a timestamp of a pixel corresponding to a sensing element that does not sense events. When "0" is applied as the timestamp "null," an error may occur during interpolating of a new timestamp. The event signal processing apparatus may estimate, based on the timestamps of the timestamp map 201, a timestamp of a pixel corresponding to a sensing element that does not sense events, and may generate a timestamp map 404. The event signal processing apparatus may interpolate new timestamps based on timestamps of the timestamp map 404. Also, the event signal processing apparatus may restore a timestamp of a pixel corresponding to a sensing element that does not sense events in a new timestamp map including the interpolated timestamps to the original timestamp "null."

Figure 4E:

Referring to FIG. 4E, the event signal processing apparatus may generate a new timestamp map 405 by interpolating new timestamps based on a vector representing a flow of events. For example, the event signal processing apparatus may generate the vector 202 based on the timestamps of the original timestamp map 201. The event signal processing apparatus may set timestamps of sub-pixels arranged in the direction 203 perpendicular to the vector 202 to be the same as a timestamp of a target pixel. The event signal processing apparatus may interpolate, based on the set timestamps, timestamps of the other sub-pixels. The timestamps of the other sub-pixels may not yet be set.

For example, the event signal processing apparatus may set a timestamp "null" as a timestamp of a sub-pixel determined to be out of a boundary in a direction of the vector 202. The boundary may be, for example, a diagonal line corresponding to pixels having a timestamp "4."

Figure 5A:
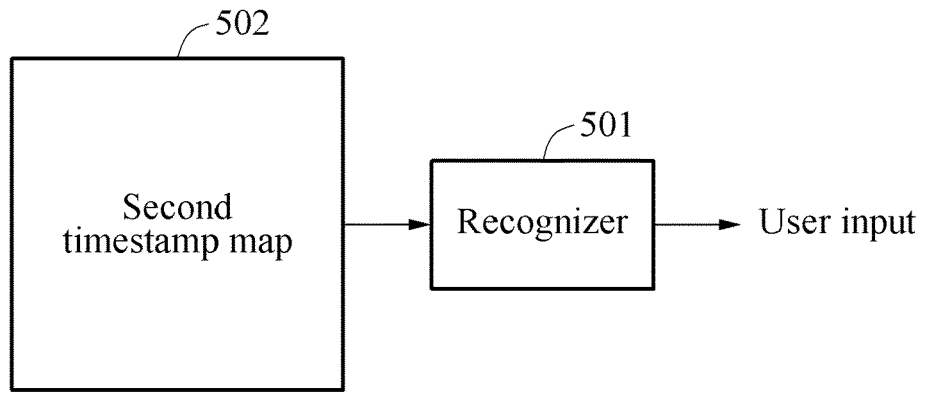
FIGS. 5A, 5B and 5C are diagrams illustrating operations of recognizing a user input corresponding to event signals, according to an exemplary embodiment.
Figure 5B:
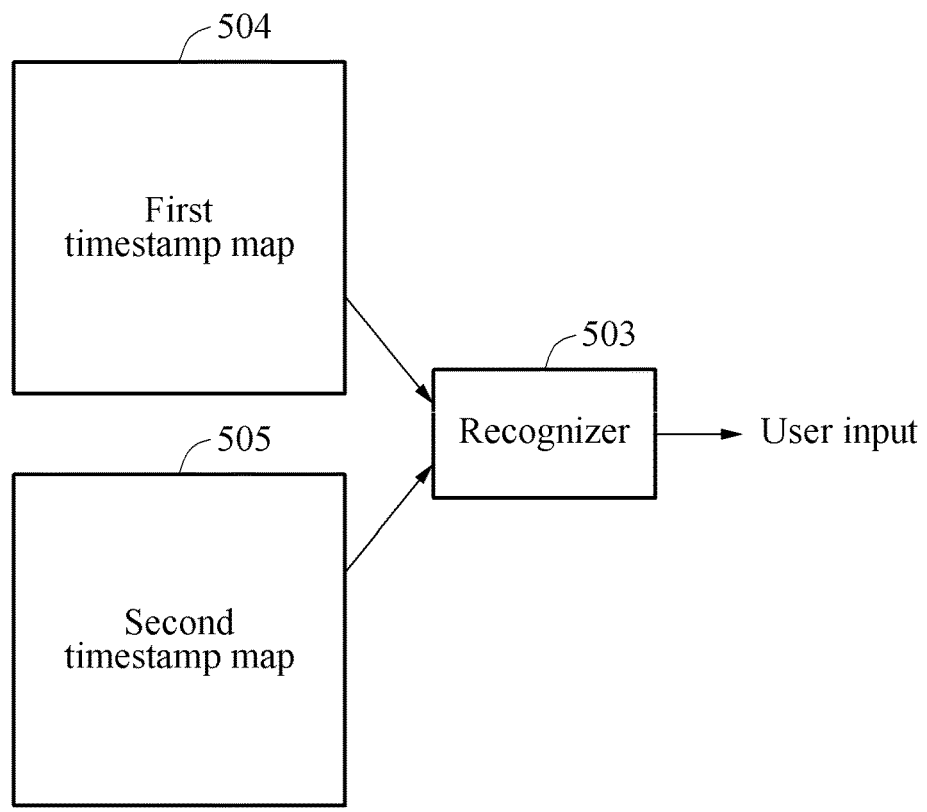
Figure 5C:
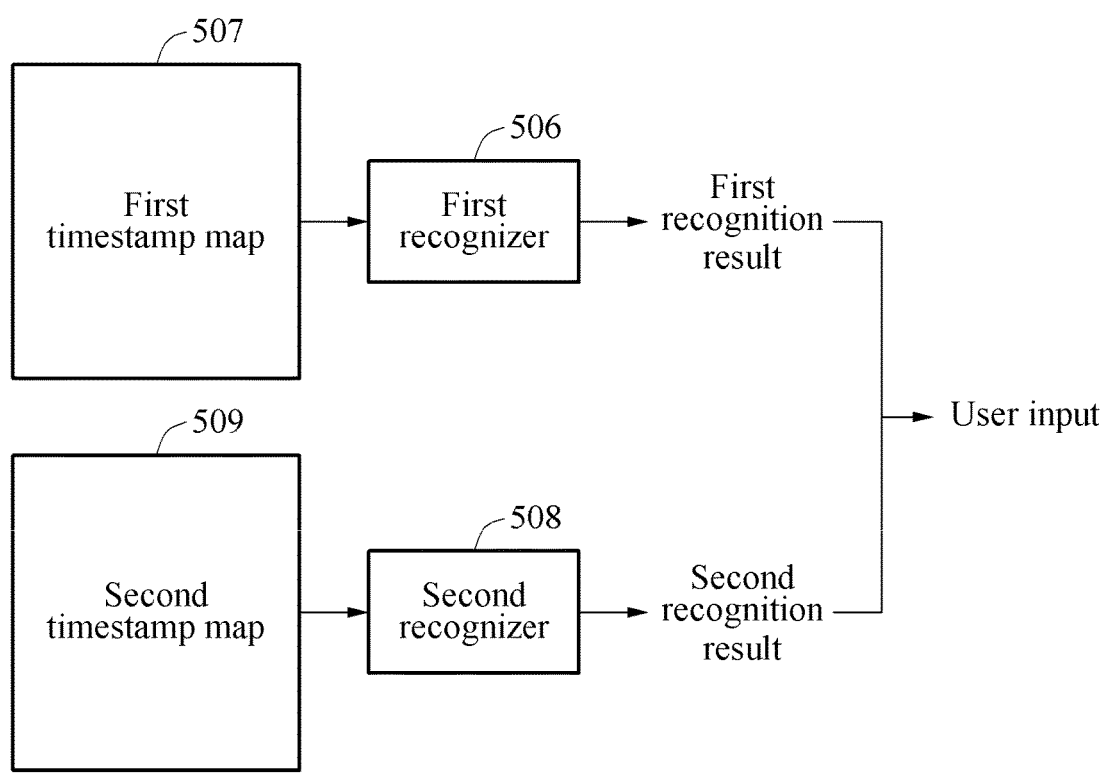

FIGS. 5A, 5B and 5C are diagrams illustrating operations of recognizing a user input corresponding to event signals, according to an exemplary embodiment.

Referring to FIG. 5A, a recognizer 501 recognizes a user input based on a second timestamp map 502 generated by an event signal processing apparatus. The second timestamp map 502 may include a new timestamp interpolated by the event signal processing apparatus. The recognizer 501 receives an input of the second timestamp map 502, and may recognize the user input using an analysis result based on the second timestamp map 502. A resolution of the second timestamp map 502 may be higher than a resolution of a first timestamp map, and thus it is possible to enhance a performance of recognition of a user input.

Referring to FIG. 5B, a recognizer 503 recognizes a user input based on a first timestamp map 504 in which interpolation is not performed, and a second timestamp map 505 that is generated through interpolation. A resolution of the second timestamp map 505 may be higher than a resolution of the first timestamp map 504, and accordingly the second timestamp map 505 may be enlarged. For example, when the second timestamp map 505 is enlarged, the enlarged second timestamp map 505 may correspond to a movement of an object that is relatively close to an event-based sensor, and the first timestamp map 504 may correspond to a movement of an object that is relatively far from the event-based sensor. The recognizer 503 may utilize a combination of the first timestamp map 504 and the second timestamp map 505 with different conditions to recognize a user input, and thus it is possible to increase an accuracy of recognition.

Referring to FIG. 5C, a first recognizer 506 corresponding to a recognition distance of a first timestamp map 507 receives an input of the first timestamp map 507, and a second recognizer 508 corresponding to a recognition distance of an enlarged second timestamp map 509 receives an input of the second timestamp map 509. The first recognizer 506 and the second recognizer 508 generate a first recognition result and a second recognition result, respectively. The generated first recognition result and the generated second recognition result are used to recognize a user input corresponding to event signals.

Figure 6:
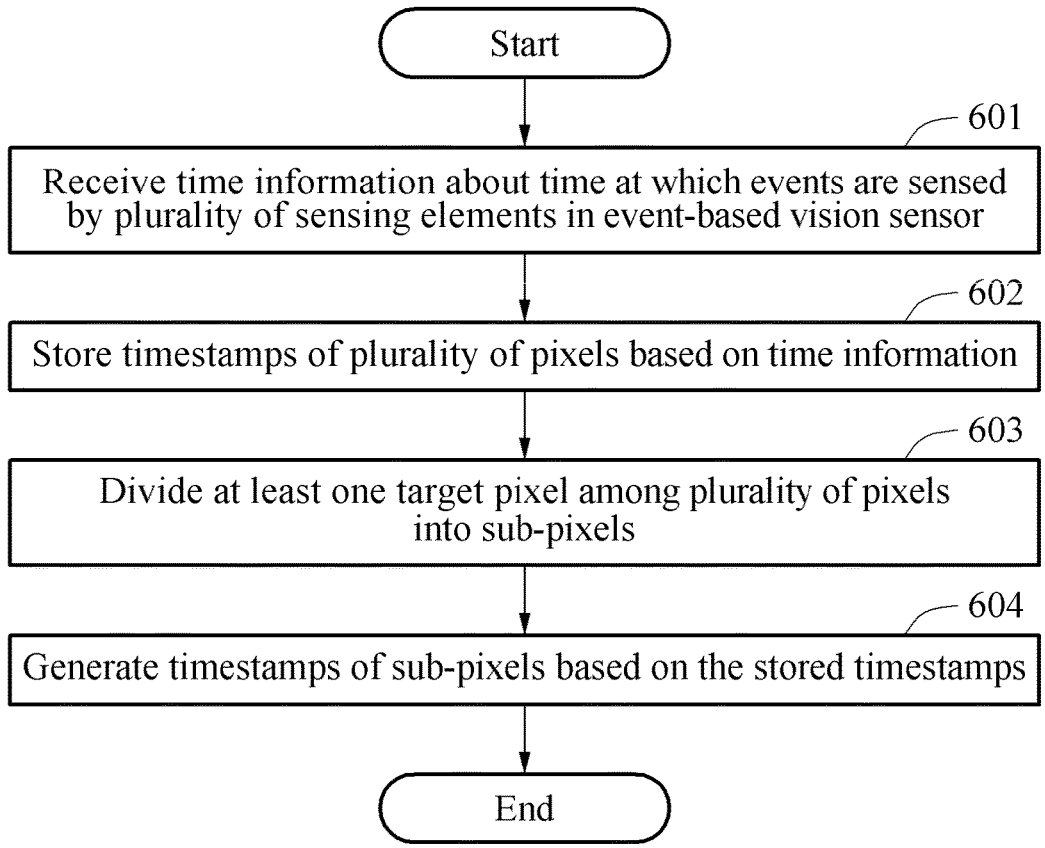
FIG. 6 is a flowchart illustrating a pixel augmentation method based on an event-based vision sensor, according to an exemplary embodiment.

FIG. 6 is a flowchart illustrating a pixel augmentation method based on an event-based vision sensor, according to an exemplary embodiment. In the present disclosure, a "pixel augmentation" may refer to an "increase in a number of pixels."

Referring to FIG. 6, in operation 601, a pixel augmentation apparatus based on the event-based vision sensor receives time information about times at which events are sensed by a plurality of sensing elements in the event-based vision sensor. The events may be sensed by the sensing elements, respectively. The event-based vision sensor may be, for example, a dynamic vision sensor (DVS). The event-based vision sensor may sense an event and may output an event signal. The event-based vision sensor may respond to an event in which a change in an intensity is greater than or equal to a threshold and that is sensed by a sensing element, and may output an event signal based on an activation signal output from activated sensing elements. An image formed based on event signals output by the event-based vision sensor sensing a flow of events may represent information about a contour of a moving object, but may not include detailed information, for example, information about colors or textures.

The event-based vision sensor may output an event signal based on a response to an event, and accordingly may have low energy consumption and a wide lighting condition. When the event-based vision sensor is used, a terminal, for example, a mobile device, may quickly collect signals by switching from a standby state to an operating state, and may instantly respond to a user request to unlock the terminal, due to low energy consumption. Also, due to a wide lighting condition for an event, the event-based vision sensor may sense an event and may output an event signal even in an environment with a weak light source. Because a characteristic of the event-based sensor described above with reference to FIGS. 1 through 5C is applicable to the event-based vision sensor, the event signal may include at least one among identification information of a sensing element that senses an event, a timestamp and a type of events.

In operation 602, the pixel augmentation apparatus stores timestamps of a plurality of pixels based on the received time information. The stored timestamps may be used to form a timestamp map, and the above-described examples are also applicable to operation 602.

In operation 603, the pixel augmentation apparatus divides at least one target pixel among the plurality of pixels into sub-pixels. A number of the sub-pixels may be defined in advance. For example, the pixel augmentation apparatus may divide a target pixel located in a center among the plurality of pixels of FIG. 2, to generate four sub-pixels of FIG. 3A. In this example, the pixels may correspond to timestamps of the timestamp map.

In operation 604, the pixel augmentation apparatus generates timestamps of the sub-pixels based on the stored timestamps. The timestamps of the sub-pixels may be generated by performing interpolation based on the stored timestamps, and interpolated timestamps may be used to form a new timestamp map. For example, the pixel augmentation apparatus may divide a target pixel into at least one sub-pixel and may interpolate a timestamp of the at least one sub-pixel, to increase a number of pixels.

The above description of FIGS. 1 through 5C is also applicable to the pixel augmentation method performed by the pixel augmentation apparatus, and accordingly is not repeated here. In the examples described with reference to FIGS. 1 through 6, the event signal processing apparatus and the pixel augmentation apparatus may interpolate timestamps of sub-pixels, but there is no limitation thereto. Accordingly, the event signal processing apparatus and the pixel augmentation apparatus may receive timestamps of a timestamp map generated in advance from another apparatus and may interpolate new timestamps based on the received timestamps.

Figure 7:
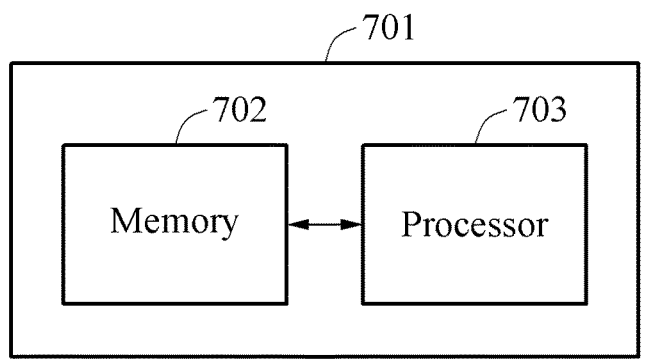
FIG. 7 is a block diagram illustrating an event signal processing apparatus or a pixel augmentation apparatus based on an event-based vision sensor, according to an exemplary embodiment.

FIG. 7 is a block diagram illustrating an event signal processing apparatus or a pixel augmentation apparatus based on an event-based vision sensor, according to an exemplary embodiment.

Referring to FIG. 7, in an example, an apparatus 701 includes a memory 702 and a processor 703. In this example, the apparatus 701 may be an event signal processing apparatus. The memory 702 may store a first timestamp map generated based on event signals output from an event-based sensor, or may record a program executed by the processor 703. The processor 703 may acquire the first timestamp map from the memory 702, and may generate a second timestamp map by interpolating a new timestamp based on at least two timestamps included in the first timestamp map. The above description of FIGS. 1 through 6 is also applicable to the processor 703.

In another example, the apparatus 701 may be a pixel augmentation apparatus based on an event-based vision sensor. In this example, the memory 702 may store timestamps of a plurality of pixels, or may record a program executed by the processor 703. The timestamps of the pixels may be generated based on time information about times at which events are sensed by a plurality of sensing elements in the event-based vision sensor. The processor 703 may acquire the timestamps from the memory 702, and may divide at least one target pixel among the plurality of pixels into sub-pixels. A number of the sub-pixels may be defined in advance. The processor 703 may generate timestamps of the sub-pixels based on the acquired timestamps. The above description of FIGS. 1 through 6 is also applicable to the processor 703.

In addition, the exemplary embodiments may also be implemented through computer-readable code and/or instructions on a medium, e.g., a computer-readable medium, to control at least one processing element to implement any of the above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An event signal processing method of an event signal processing apparatus, the event signal processing method comprising:
   receiving, by the event signal processing apparatus, from sensing elements of an event-based sensor, event signals comprising timestamps;
   generating, by the event signal processing apparatus, a first timestamp map comprising pixels corresponding to the sensing elements, in which the timestamps that are received are respectively arranged;
   generating, by the event signal processing apparatus, a second timestamp map by:
      dividing, by the event signal processing apparatus, into sub-pixels, a target pixel among the pixels included in the first timestamp map that is generated; and
      interpolating, by the event signal processing apparatus, a sub-pixel timestamp into each of the sub-pixels included in the first timestamp map, based on a target pixel timestamp of the target pixel and one or more timestamps for one or more pixels adjacent to a respective one of the sub-pixels, among the timestamps arranged respectively in the pixels; and
   recognizing, by the event signal processing apparatus, a user input corresponding to the event signals, based on the second timestamp map that is generated.

2. The event signal processing method of claim 1, wherein the interpolating, by the event signal processing apparatus, the sub-pixel timestamp into each of the sub-pixels included in the first timestamp map comprises interpolating, by the event signal processing apparatus, the sub-pixel timestamp into each of the sub-pixels included in the first timestamp map, based on an average of at least two timestamps among the timestamps arranged respectively in the pixels included in the first timestamp map.

3. The event signal processing method of claim 1, wherein the interpolating, by the event signal processing apparatus, the sub-pixel timestamp into each of the sub-pixels included in the first timestamp map comprises setting, by the event signal processing apparatus, the sub-pixel timestamp of each of the sub-pixels to the target pixel timestamp of the target pixel.

4. The event signal processing method of claim 1, wherein the interpolating, by the event signal processing apparatus, the sub-pixel timestamp into each of the sub-pixels included in the first timestamp map comprises:
   selecting, by the event signal processing apparatus, a highest timestamp from the one or more timestamps for the one or more pixels adjacent to the respective one of the sub-pixels; and
   setting, by the event signal processing apparatus, the sub-pixel timestamp of the respective one of the sub-pixels to be an average of the highest timestamp that is selected and the target pixel timestamp of the target pixel.

5. The event signal processing method of claim 1, wherein the interpolating, by the event signal processing apparatus, the sub-pixel timestamp into each of the sub-pixels included in the first timestamp map comprises:

generating, by the event signal processing apparatus, a vector, based on the timestamps arranged respectively in the pixels included in the first timestamp map, the vector representing a flow of events corresponding to the event signals; and interpolating, by the event signal processing apparatus, the sub-pixel timestamp into each of the sub-pixels included in the first timestamp map, based on the vector that is generated.

6. The event signal processing method of claim 1, wherein a first resolution of the second timestamp map is higher than a second resolution of the first timestamp map.

7. The event signal processing method of claim 1, wherein each of the sensing elements senses an event and outputs an activation signal.

8. The event signal processing method of claim 1, wherein each of the event signals comprises identification information identifying one of the sensing elements sensing an event, and a timestamp indicating a time at which the event is sensed.

9. The event signal processing method of claim 1, further comprising enlarging the second timestamp map that is generated,
wherein the recognizing, by the event signal processing apparatus, the user input comprises recognizing the user input corresponding to the event signals, based on the first timestamp map that is generated and the second timestamp map that is enlarged.

10. The event signal processing method of claim 1, further comprising:
generating, by the event signal processing apparatus, a first recognition result corresponding to the event signals, based on the first timestamp map that is generated; and
generating, by the event signal processing apparatus, a second recognition result corresponding to the event signals, based on the second timestamp map that is generated,
wherein the recognizing, by the event signal processing apparatus, the user input comprises recognizing the user input corresponding to the event signals, based on the first recognition result and the second recognition result that are generated.

11. A non-transitory computer-readable storage medium storing a program comprising instructions to control a processor to perform the method of claim 1.

12. A pixel augmentation method of a pixel augmentation apparatus based on an event-based vision sensor, the pixel augmentation method comprising:
receiving, by the pixel augmentation apparatus, time information for times at which events are sensed by sensing elements of the event-based vision sensor;
generating, by the pixel augmentation apparatus, timestamps for pixels corresponding to the sensing elements, based on the time information that is received;
dividing, by the pixel augmentation apparatus, a target pixel among the pixels into sub-pixels;
generating, by the pixel augmentation apparatus, a sub-pixel timestamp of each of the sub-pixels, based on a target pixel timestamp of the target pixel and one or more timestamps for one or more pixels adjacent to a respective one of the sub-pixels, among the timestamps for the pixels that are generated; and
recognizing, by the pixel augmentation apparatus, a user input corresponding to the events, based on the sub-pixel timestamp that is generated.

13. The pixel augmentation method of claim 12, wherein the generating, by the pixel augmentation apparatus, the sub-pixel timestamp of each of the sub-pixels comprises setting the sub-pixel timestamp of each the sub-pixels to the target pixel timestamp of the target pixel.

14. The pixel augmentation method of claim 12, wherein the generating, by the pixel augmentation apparatus, the sub-pixel timestamp of each of the sub-pixels comprises:
determining, by the pixel augmentation apparatus, an average of the target pixel timestamp of the target pixel and a highest timestamp among the one or more timestamps for the one or more pixels adjacent to the respective one of the sub-pixels; and
setting, by the pixel augmentation apparatus, the sub-pixel timestamp of the respective one of the sub-pixels to be the average.

15. The pixel augmentation method of claim 12, wherein the generating, by the pixel augmentation apparatus, the sub-pixel timestamp of each of the sub-pixels comprises:
generating, by the pixel augmentation apparatus, a vector, based on the timestamps for the pixels that are generated, the vector representing a flow of the events; and
setting, by the pixel augmentation apparatus, the sub-pixel timestamp of each of the sub-pixels, based on a direction of the vector that is generated.

16. The pixel augmentation method of claim 15, wherein the setting, by the pixel augmentation apparatus, the sub-pixel timestamp of each of the sub-pixels comprises:
selecting, by the pixel augmentation apparatus, from the sub-pixels, a first sub-pixel that is arranged perpendicular to the direction of the vector that is generated; and
setting, by the pixel augmentation apparatus, the sub-pixel timestamp of the first sub-pixel that is selected, to the target pixel timestamp of the target pixel.

17. The pixel augmentation method of claim 15, wherein the setting the sub-pixel timestamp of each of the sub-pixels comprises:
selecting, by the pixel augmentation apparatus, from the sub-pixels, a first sub-pixel that is arranged parallel to the direction of the vector that is generated; and
generating, by the pixel augmentation apparatus, the sub-pixel timestamp of the first sub-pixel that is selected, based on an adjacent pixel timestamp of an adjacent pixel adjacent to the first sub-pixel that is selected, among the timestamps for the pixels that are generated.

18. The pixel augmentation method of claim 12, wherein the generating, by the pixel augmentation apparatus, the sub-pixel timestamp of each of the sub-pixels comprises:
estimating, by the pixel augmentation apparatus, based on the timestamps for the pixels that are generated, a first timestamp of a first pixel corresponding to one of the sensing elements that does not sense the events;
generating, by the pixel augmentation apparatus, the sub-pixel timestamp of each of the sub-pixels, based on the first timestamp that is estimated and the timestamps for the pixels that are generated; and
restoring, by the pixel augmentation apparatus, the first timestamp of the first pixel corresponding to the one of the sensing elements, to an original timestamp.

19. An event signal processing apparatus comprising:
a processor configured to:
receive, from sensing elements of an event-based sensor, event signals comprising timestamps;

generate a first timestamp map comprising pixels corresponding to the sensing elements, in which the timestamps that are received are respectively arranged;

generate a second timestamp map by dividing, into sub-pixels, a target pixel among the pixels included in the first timestamp map that is generated, and interpolating a sub-pixel timestamp into each of the sub-pixels included in the first timestamp map, based on a target pixel timestamp of the target pixel and one or more timestamps for one or more pixels adjacent to a respective one of the sub-pixels, among the timestamps arranged respectively in the pixels; and recognize a user input corresponding to the event signals, based on the second timestamp map that is generated.

20. The event signal processing apparatus of claim 19, wherein the processor is further configured to:

generate a vector, based on the timestamps arranged respectively in the pixels included in the first timestamp map, the vector representing a flow of events corresponding to the event signals;

determine a pixel of the first timestamp map to be outside a boundary of the first timestamp map in a direction of the vector that is generated; and set a timestamp of the pixel that is determined, to a null timestamp.

21. A pixel augmentation apparatus based on an event-based vision sensor, the pixel augmentation apparatus comprising:

a processor configured to:
receive time information of times at which events are sensed by sensing elements of the event-based vision sensor;

generate timestamps for pixels corresponding to the sensing elements, based on the time information that is received;

divide a target pixel among the pixels into sub-pixels;

generate a sub-pixel timestamp of each of the sub-pixels, based on a target pixel timestamp of the target pixel and one or more timestamps for one or more pixels adjacent to a respective one of the sub-pixels, among the timestamps for the pixels that are generated; and recognize a user input corresponding to the events, based on the sub-pixel timestamp that is generated.

22. The pixel augmentation apparatus of claim 21, wherein the processor is further configured to:

divide a sub-pixel among the sub-pixels into additional sub-pixels; and generate a new timestamp of each of the additional sub-pixels, based on the timestamps for the pixels that are generated and the sub-pixel timestamp of each of the sub-pixels that is generated.

* * * * *